C. M. SPANGLER.
UNIVERSAL JOINT FOR COUPLING SHAFTS.
APPLICATION FILED APR. 25, 1921.
1,407,445.
Patented Feb. 21, 1922.
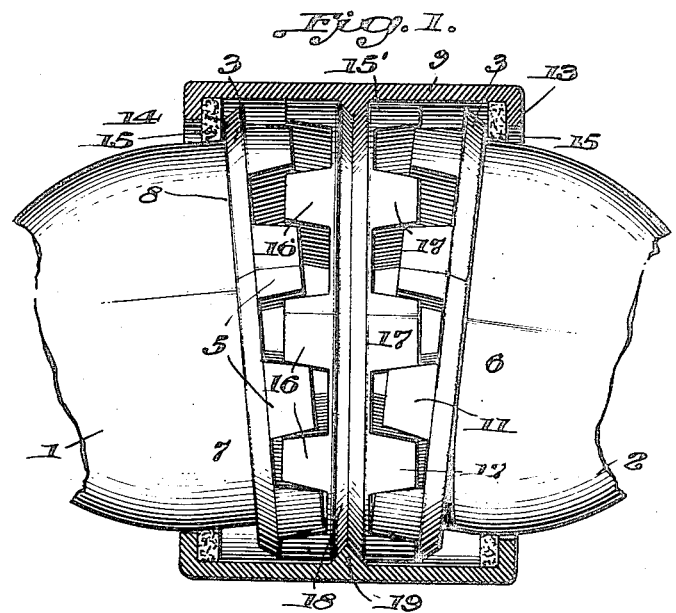
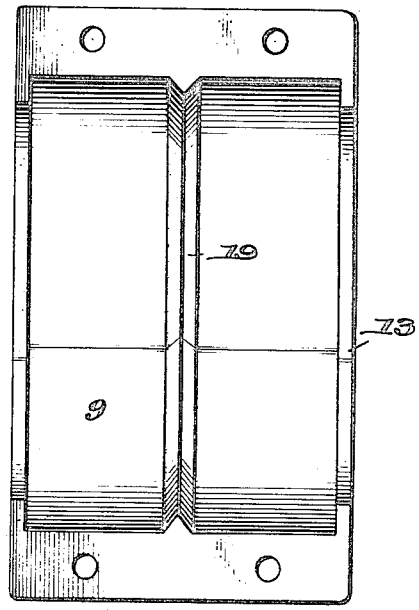
Inventor,
Charles M. Spangler
By [signature], Atty.

UNITED STATES PATENT OFFICE.

CHARLES M. SPANGLER, OF EMPORIUM, PENNSYLVANIA.

UNIVERSAL JOINT FOR COUPLING SHAFTS.

1,407,445.

Specification of Letters Patent. Patented Feb. 21, 1922.

Application filed April 25, 1921. Serial No. 464,066.

*To all whom it may concern:*

Be it known that I, CHARLES M. SPANGLER, a citizen of the United States, residing at Emporium, in the county of Cameron and State of Pennsylvania, have invented certain new and useful Improvements in Universal Joints for Coupling Shafts, of which the following is a specification.

This invention relates to universal joints for coupling shafts in factories or on automobiles or wherever such a joint is useful.

My invention relates to that general class of universal joints comprising parts which can be arranged at different angles to each other and are provided with intermeshing teeth and my improvements relate to the form and relationship of the teeth, the combination of the joint or coupling parts and a casing which houses and protects the intermeshing teeth, the provision of a lubricating reservoir which supplies the teeth with a lubricant and, also, to the employment of an intermediate coupling part or disk combined with the teeth on the coupling or joint parts and with the casing in a novel manner.

The disclosure of the invention which is found in the drawings and set forth hereinafter is to be considered as illustrative of the preferred form thereof and not as restrictive of the scope of the invention as modifications may be resorted to.

In the accompanying drawings:

Figure 1, is an elevation, with the casing in section;

Fig. 2, is an edge view of the disc;

Fig. 3, is an inner view of one half of the casing.

The present invention may be used wherever a universal joint shaft coupling is required for the purpose of driving one shaft from another whether the shafts be at an angle to each other, or, arranged in straight line relationship. The invention being susceptible of either use, it is to be understood that while it is designated a "universal" joint, it may be employed in any relationship of shafting to which it is adapted. The members or parts of the joint may be provided with hubs of various shapes and sizes according to the use to which the joint is to be put; similarly, although ten teeth may be used on each of the coupling parts or heads, the invention is not thus limited.

The respective heads or parts of the coupling are shown at 1 and 2, each being provided with a peripheral flange 3 and having a flat end or face from which the coupling teeth project. One of the parts is provided with teeth 5 and the other with teeth 11 which radiate therefrom and project from the inner face of said part. The teeth 5 and 11 taper from their outer to their inner ends, being wider at their outer ends than at their inner ends and they are also beveled on their sides, being narrowest at their inner faces.

To house and protect the teeth there is provided a casing 9 which is in halves (one of which appears in Fig. 3), connected by suitable bolts and nuts passing through the holes shown in said figure. The casing has circular flanges 13 and 14 and felt washers or gaskets 1⁵

There is employed an intermediate coupling disk 15' which is provided with teeth 16 on one side and teeth 17 on the other side respectively meshing with the teeth 5 and 11, and formed and arranged like the said teeth. The coupling disk 15 is provided with an annular groove 18 (which may be of V-shape) and there is provided on the interior of the sections of the casing or housing 9 an annular rib 19 which is received in the groove 18. The groove 18 and rib 19 afford a means whereby the casing 9 may be clamped around disk 15' and insure that the disk 15' is located in correct intermediate position between the parts 1 and 2 and yet without interfering with its entire freedom or cooperation with said parts 1 and 2.

I claim:

1. In a universal joint, the combination of joint or coupling members respectively provided with teeth and freely movable to assume different angular relationship to each other, a coupling disk loosely mounted between said teeth and itself provided with teeth on its opposite sides which mesh with the respective sets of teeth of the coupling parts aforesaid, and a casing or housing cooperating with the coupling parts and with the disk for the purpose of housing the teeth and disk and also for maintaining the disk in intermediate operative coupling position between the coupling parts aforesaid without interfering with the adaptability of the coupling members to freely move to different angular relationships.

2. In a universal joint, the combination of joint or coupling members respectively provided with teeth, a coupling disk interposed between said teeth and itself provided with teeth on its opposite sides which mesh with the respective sets of teeth of the coupling parts aforesaid, said disk being provided with an annular groove, and a casing or housing having flanges cooperating with the parts of the coupling and also provided with a rib which is received in the groove of the disk and serves to hold the disk in intermediate position between the coupling parts, said casing or housing enclosing the disk and the teeth on the coupling parts.

In testimony whereof I affix my signature.

CHARLES M. SPANGLER.